US007222887B2

(12) United States Patent
Schwarz et al.

(10) Patent No.: US 7,222,887 B2
(45) Date of Patent: May 29, 2007

(54) FLUID OPERATED CONTRACTILE DRIVE

(75) Inventors: Stefan Schwarz, Altdorf (DE); Bernd Lorenz, Baltmannsweiler (DE)

(73) Assignee: Festo AG & Co., Esslingen (DE)

( * ) Notice: Subject to any disclaimer, the term of this patent is extended or adjusted under 35 U.S.C. 154(b) by 49 days.

(21) Appl. No.: 10/498,405

(22) PCT Filed: Feb. 21, 2003

(86) PCT No.: PCT/EP03/01781

§ 371 (c)(1), (2), (4) Date: Jun. 10, 2004

(87) PCT Pub. No.: WO03/085271

PCT Pub. Date: Oct. 16, 2003

(65) Prior Publication Data

US 2005/0093293 A1 May 5, 2005

(30) Foreign Application Priority Data

Apr. 11, 2002 (DE) .......................... 202 05 719 U

(51) Int. Cl.
*F16L 47/00* (2006.01)

(52) U.S. Cl. ....................... 285/247; 285/101; 285/249

(58) Field of Classification Search ........ 285/247–251, 285/357, 95, 100–102, 109
See application file for complete search history.

(56) References Cited

U.S. PATENT DOCUMENTS 2,470,538 A * 5/1949 Wolfram et al. ............ 285/249
5,735,553 A * 4/1998 Niemiec ..................... 285/101

FOREIGN PATENT DOCUMENTS

| | | |
|---|---|---|
| DE | 100 27 731 | 11/2001 |
| DE | 100 34 389 A1 | 2/2002 |
| FR | 1 092 792 | 4/1955 |
| GB | 2 248 664 A | 4/1992 |
| JP | 02 256993 | 10/1990 |
| JP | 03 066995 | 3/1991 |

* cited by examiner

*Primary Examiner*—Aaron Dunwoody
(74) *Attorney, Agent, or Firm*—Hoffman & Baron, LLP

(57) ABSTRACT

A fluid operated contractile drive which has a contractile hose (4) extending between two head pieces (2 and 3), and attached to at least one head piece (2 and 3) by having its respective end section (10) clamped in an annular clamping gap (26) defined between clamping surfaces (24 and 25), extending in an at least partially inclined manner in relation to the longitudinal axis (9) of the contractile hose (4) of a first clamping unit (22) having a force output means (17) serving for external force output and a second clamping unit (23) able to be shifted axially in relation to the first clamping unit. In addition to the contractile hose (4) between the two clamping unit (22 and 23) there are loading means (45), effective between same, such loading means (45) acting on the clamping unit (22 and 23) to produce a reduction of the width of the clamping gap (26).

15 Claims, 1 Drawing Sheet

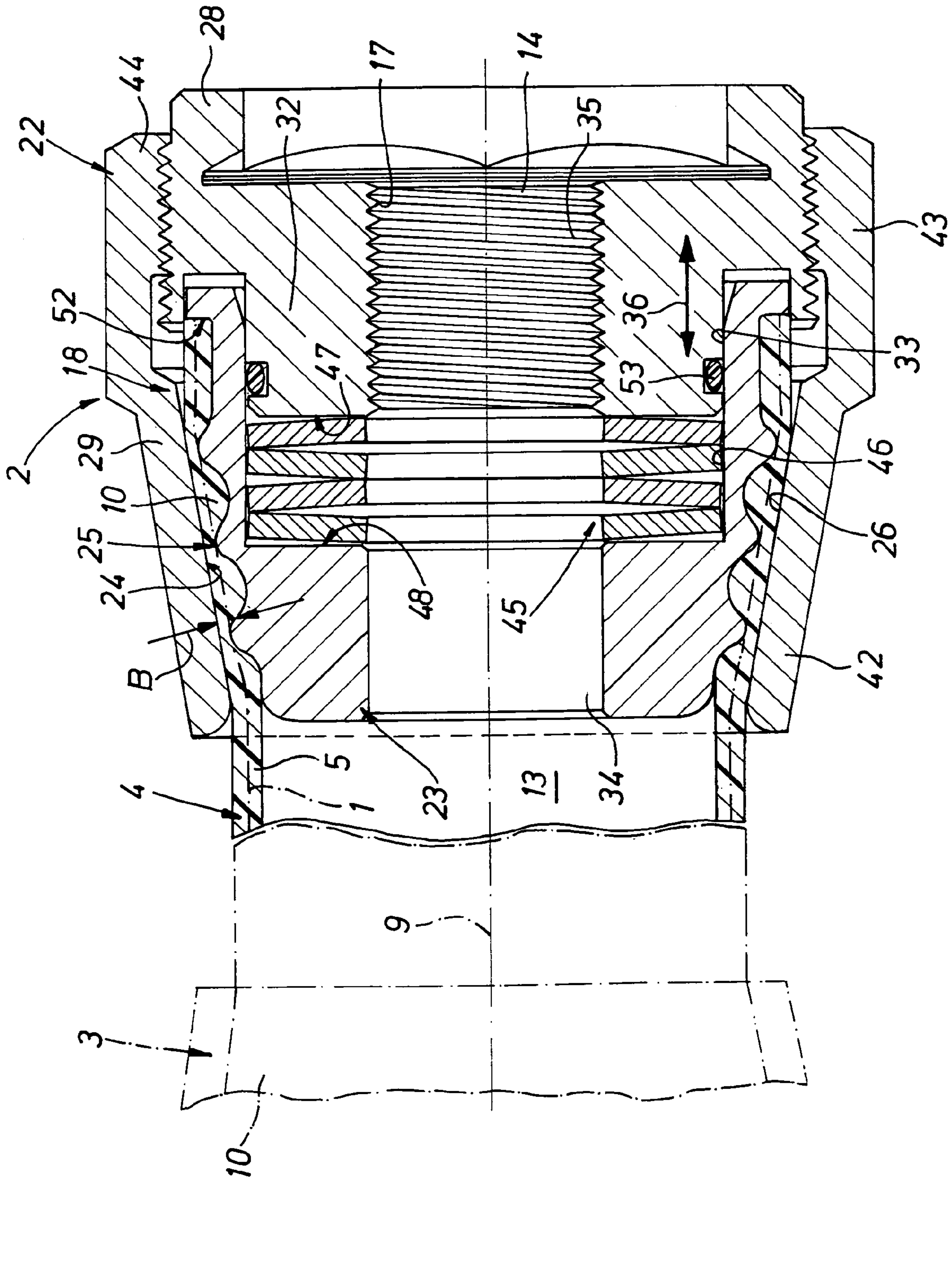
28
44
22
17
14
32
35
43
52
36
33
18
53
47
2
29
46
10
25
26
24
48
45
B
42
5
13
34
4
1
23
9
3
10

FLUID OPERATED CONTRACTILE DRIVE

This application claims priority based on an International Application filed under the Patent Cooperation Treaty, PCT/EP03/01781, filed on Feb. 21, 2003, and German Patent Application No. DE 202 05 719.4, filed on Apr. 11, 2002.

FIELD OF THE INVENTION

The invention relates to a fluid operated contractile drive comprising a contractile hose extending between two head pieces, and contracting longitudinally when its internal hose space defined by it is acted upon by fluid pressure to exert axial tension forces on the head pieces drawing them together, the contractile hose being attached to at least one head piece by having its respective end section clamped in an annular clamping gap defined between clamping surfaces, extending at least partially inclined in relation to the longitudinal axis of the contractile hose and of a first clamping unit having a force output means serving for external force output and a second clamping unit able to be shifted axially in relation to the first clamping unit.

BACKGROUND OF THE INVENTION

In the case of a known contractile drive disclosed in the German patent publication 10,034,389 A1 a contractile hose extends between two head pieces which are respectively provided with two clamping units and which are screwed together like a gland nut. Between the clamping units an annular clamping gap is defined, in which the contractile hose is clamped at its associated end region. If the internal space of the contractile hose is charged with a pressure medium subject to a certain actuating pressure, the contractile hose will expand radially and will simultaneously pull the two head pieces toward one another. It is in this manner that it is possible for external structures or, respectively, components, which are fixed on the force output means of the head pieces, to be moved relatively toward each other and/or clamped together.

In the case of the known contractile drive there was the problem that owing to its liability to deformation the contractile hose could be pulled out of the clamping gap. Therefore the two clamping units were designed to be adjusted in the longitudinal direction of the contractile drive and the tightening faces were so contrived that owing to frictional effects between them and the contractile hose a certain entraining effect is produced with the result that on actuation of the contractile hose there is an automatic reinforcement of the gripping or clamping action between the two clamping units.

It has however now been discovered that there are still certain shortcomings with the known clamping attachment, which are more particularly significant at raised temperatures or in the case of the use of relatively soft hose materials. The material then tends to creep and in the worst case the contractile hose may slip out of the head piece completely.

SUMMARY OF THE INVENTION

Accordingly one object of the present invention is to provide a contractile drive of the type initially mentioned with a further improvement of the connection between the contractile hose and one or both of the two head pieces.

The design for achieving this object is characterized by loading means provided in addition to the contractile hose and effective between the two clamping units and acting on the clamping units to reduce the width of the clamping gap.

It is in this manner that it is possible to ensure that the end section, placed in the clamping gap, of the contractile hose will always remain firmly clamped reliably, even if owing to fatigue of the hose material or for some other reason there is a tendency to creep, which would inherently reduce the clamping action. Owing to the loading means the two clamping units are automatically reset to a degree dependent on the reduction in the wall thickness of the clamped end section of the contractile hose so that the desired clamping action may be permanently maintained even despite the effect of unfavorable environmental conditions.

In principle it would be possible to so design the loading means that they only take effect following or at the occurrence of certain events, for example when the temperature of the surroundings has exceeded a certain value. Such a design could be realized by the use of so-called memory metal. The simplest and at least presently most economic design is one in which the loading means are so designed that they are always in action. This is something which may be more particularly achieved by the use of loading means having resiliently elastic properties, more especially in the form of a structure corresponding to a mechanical spring means. Particularly compact dimensions may in this case be produced by having mechanical spring means, which comprises a belleville washer stack.

Furthermore structures of the design are possible in the case of which the action of the loading means is produced, or at least aided, by the fluid pressure medium employed for the operation of the contractile drive. For this purpose an actuating space may be provided between axially opposite actuating faces of the two clamping units, such space being constantly connected with the inner space of the hose. The clamping action produced will in this case be dependent directly on the pressure action on the contractile drive so that the clamping action increases with an increase in the load on the contractile drive.

In the case of a preferred embodiment of the invention the clamping faces so run together at an angle within the clamping gap that their distance from the longitudinal axis of the contractile hose increases toward the outer end region, axially opposite to the contractile hose, of the respective head piece. The diameter of the annular clamping gap then preferably increases toward the outer end region of the head piece.

It has been found to be particularly advantageous if at least one of the clamping faces is designed with a corrugated cross sectional outline. It is then a question here preferably of that clamping face which acts on the contractile hose at the inner periphery.

Preferably the respective head piece is provided with holding means serving to load the two clamping units to maintain a basic clamping effect on the contractile hose irrespectively of the fluid actuating effect in the inner space of the hose. The holding means may for example be in the form of a screw connection, which is provided between a clamping nut and the force output part of the first clamping unit.

A particularly compact arrangement is produced if the loading means responsible for the active clamping effect of the contractile hose are located in a region which is within the contractile hose.

In connection with the design in accordance with the invention furthermore an advantageous safety feature may be produced. Since owing to the reliable fixation and automatic resetting of the clamping attachment slipping of the contractile hose out of the head piece is prevented, when there is an increase in overloading here will be the effect such that the hose material in the clamped region, which becomes thinner, will become slightly porous. Air may escape through the fine holes so that overloading of the hose material or even splitting thereof is avoided.

BRIEF DESCRIPTION OF THE DRAWINGS

In the following the invention will be described with reference to the accompanying drawing in detail.

The single FIGURE thereof shows a preferred embodiment of the invention in the form of an actuating means, partly in longitudinal section.

DESCRIPTION OF THE PREFERRED EMBODIMENTS

The contractile drive illustrated comprises the two (first and second) spaced apart head pieces 2 and 3, only one head piece 2 being illustrated completely in order to make the drawing more straightforward.

The two head pieces 2 and 3 are connected with each other by way of a contractile hose 4. At least in the non-activated state of the contractile drive the contractile hose 4 possesses a cylindrical tubular configuration. The longitudinal axis of the contractile drive, which at the same time represents the longitudinal axis of the contractile hose 4, is indicated at 9.

The contractile hose 4 possesses an elongated hose body 5 preferably manufactured of a material having rubber-like properties. As a material use is preferably made of rubber or an elastomeric material having similar properties. A strand structure 1, only indicated in the drawing in chained lines, is embedded in the material of the hose body 5 and such structure is preferably completely surrounded by the hose body material and possesses an arrangement which is coaxial to the hose body 5. The structural form of the contractile hose 4 can more particularly be as disclosed in the German patent publication 29,906,626 (utility model) or in the European patent publication 0 161 750 B1.

The contractile hose 4 has its two axial end sections 10 so fixed at the associated head pieces 2 and 3 that on the one hand there is a fluid-tight connection between the hose body 5 and the respective head piece 2 and 4 and on the other hand the stand structure 1 is in a position of exerting tension forces on the respective head piece 2 and 3. Instead of the strand structure 1 other suitable means could be employed to transmit the axial tension forces.

The contractile hose 4 delimits an internal hose space 13, which at the end is terminated by the two head pieces 2 and 3. Into the space 13 in the hose there opens at least one fluid duct 14, that in the working example extends preferably coaxially right through the first head piece 2 shown in its entirety. The fluid duct 14 is able to be connected with a fluid line, not illustrated in detail, which leads to a source of pressure medium. By the use of an intermediately placed control valve arrangement there is the possibility of feeding a fluid pressure medium into the inner space 13 of the hose or of letting off such medium from it. Preferably the contractile drive is operated with gaseous pressure medium, more especially compressed air. It is also readily suitable for operation using a hydraulic fluid for example oil or water.

Each head piece 2 and 3 is provided with force output means 17 at a position accessible from the outside. Such means are in the working example constituted by a threaded section of the respective head piece 2 and 3 and render possible an attachment of the respective head piece 2 and 3 to some component, not illustrated in detail. For instance it would be possible to use the force output means 17 of the first head piece 2 to join it to the frame of a machine and to connect the other head piece 3 with a machine part moved in relation to the machine frame. The contractile drive is suitable for practically all applications, in which two components are to be shifted in relation to one another or to be clamped.

The connection with the corresponding component may be directly by way of the force output means or with the interposition of an adapter part, not illustrated in detail, which is fixed to the force output means 17.

For activation of the contractile drive by way of the fluid duct 14 pressure medium at the predetermined operational pressure is fed into the interior 13 of the hose. Owing to such gage pressure the wall of the contractile hose 4 is thrust radially outward so that there is an action in the form of a radial widening of the contractile hose 4. The consequence of this is that the contractile hose 4 is simultaneously acted upon to perform an axial contraction, axial tension forces produced by the contractile hose 4 causing an opposite movement together of the head pieces 2 and 3. This in turn means that the components held by the force output means 17 of the head pieces 2 and 3 are acted on to move together. Dependent on the particular circumstances this is accompanied by a greater or lesser opposite movement together of the two head pieces 2 and 3, the displacement of the head pieces 2 and 3 in relation to each other being termed the stroke.

For deactivation of the contractile drive the pressure medium is at least partly let off from the interior space 13 of the hose. The contractile hose 4 then contracts back to its original length so that the head pieces 2 and 3 return to the original position. This return movement may if necessary be aided by additional measures, as for example using return springs.

The particular movement and deformation properties of the contractile hose 4 are ensured in the working example by the strand structure 1. The structure involved here is for example as described in the said German patent publication 29,906,626 (utility model) or in the European patent publication 0 161 750 B1. Preferably the strand structure 1 comprises a plurality of bendable strands, which have a high degree of flexibility and simultaneously a high tensile strength in the form of one or more fibers, a type being preferred, in which the strands extend helically and peripherally around the hose body 5 between the head pieces 2 and 3 and more particularly are arranged crossing over so that rhombic grid regions are formed. Owing to the action of the internal pressure in the contractile hose 4 a change of the rhomb angle is caused, something which ultimately means that axial tension forces are established in the strand structure at the end sections 10 of the contractile hose, such forces being transmitted to the head pieces 2 and 3.

The force transmission to the head pieces 2 and 3 is possible because the contractile hose 4 is firmly held in place at its end sections 10 in the respectively associated head piece 2 and 3. For this purpose the head pieces 2 and 3 are provided with a particularly advantageous clamping device 18, which is preferably identically provided in the case of both head pieces. However, there is also the possibility of only providing one such clamping device 18.

The clamping device 18 is a direct component of the respective head piece 2 and 3. It comprises a first clamping unit 22, which is provided with the force output means 17 and furthermore possesses a second clamping unit 23 separate from the first clamping unit 22, such second unit not having any force output means 17.

The two clamping units 22 and 23 fit coaxially into one another, a first tightening face 24 provided on the first clamping unit 22 being placed radially opposite to a second tightening face 25 on the second clamping unit 23. The two tightening faces 24 and 25 being are orientated athwart the longitudinal axis 9 and facing each other.

Between the two clamping faces 24 and 25 the two clamping units 22 and 23 define an annular clamping gap 26. Such gap is open toward the inner end side, facing the respectively other head piece, the contractile hose 4 having its end section 10 concentrically fitting into the clamping gap 26 from the open end.

The two clamping units 22 and 23 are so firmly clamped together on assembly of the contractile drive that they exert a clamping force (termed the basic force) on the wall of the end section 10, lying between them. The clamping faces 24 and 25 then contact on the one hand the inner face and on the other hand contact the outer face of the hose body 5, against which they are firmly braced.

The end section 10 of the contractile hose 4 is externally surrounded by the first clamping unit 22. The second clamping unit 23 extends from the end face coaxially into the contractile hose 4.

The second clamping unit 23 is in the working example constituted by a conical element, whose enveloping face constituting the second clamping face 25 has, for part of the length and preferably for the entire length, a configuration tapering conically toward the contractile hose 4. However, the second clamping face 25 preferably is not smooth but corrugated in cross section in its outline. As a result there is an outer face with an axial sequence of alternating annular hills and valleys.

The first clamping unit 22 is multi-part in design and possesses a force output part 28 provided with the force output part 17 and furthermore a tightening nut 29 designed in the form of a gland nut. The force output part 28 has an axially extending, central bearing tailpiece 32 fitting into a complementary bearing recess 33 in the second clamping unit 23, such bearing recess 33 preferably being constituted by a stepped access opening 34 extending through the full length of the second clamping unit 23. The force output part 28 also possesses an axial through hole 35, which together with length section, adjoining the bearing tailpiece 32, of the through opening 34 constitutes the fluid duct 14 and is provided with the force output means 17 as a female screw thread.

The two clamping units 22 and 23 are designed to move in relation to each other in the longitudinal direction of the contractile hose 4, the possible direction 36 of motion being indicated by a double arrow. Here the bearing recess 33 together with the bearing tailpiece 33 surrounding it constitute an axial slide guide.

The tightening nut 29 has a sleeve-like structure with a first clamping section 42 defining the inwardly directed first tightening face 24 and an attachment section 43 axially adjoining it, which externally extends over the force output part 28 at a flange-like section. Between the tightening nut 29 and the force output part 28 there are holding means 44, which define a screw connection rendering possible a variation of the relative axial position of the two components. Instead of the screw connection other holding means with the same function could be selected.

The first tightening face 24 provided on the tightening nut 29 has the same slope as the second tightening face 25 turned toward it. It preferably has a smooth surface or only a slight degree of roughness.

In the case of both tightening faces 24 and 25 the obliqueness is such that the distance from the longitudinal axis 9 becomes larger on getting closer to the outer end region, axially opposite to the contractile hose 4, of the head piece 2. The diameter of the annular clamping gap 26 consequently becomes greater from the inner end of the head piece 2 axially outward.

The clamping device 18 additionally comprises, besides the components described so far, loading means 45 effective between the two clamping units 22 and 23, which loading means are in a position of acting on the two clamping units 22 and 23 to reduce the width B of the clamping gap 26. In the working embodiment the loading means 45 have resiliently elastic properties and are constituted by a mechanical spring means, which is arranged coaxially between the second clamping unit 23 and the force output part 28 of the clamping unit 22.

Preferably the loading means 45 comprises a belleville washer.

For the sake of having a compact and space-saving structure the loading means 45 are in the working example in a region located within the contractile hose 4. They are seated in a actuating space 46, which is placed to the fore of the bearing tailpiece 32 toward the second clamping unit 23, it being defined by a widened section of the through opening 34.

The actuating space 26 is delimited by two axially opposite actuating faces 47 and 48 of which the first actuating face 47 is provided on the end face of the bearing tailpiece 32 and the second actuating face 48 is opposite to it on the second clamping unit 23. Radially to the outside the actuating space 46 is directly delimited by the second clamping unit 23, which fits over the bearing tailpiece 32 like a gland sleeve.

The loading means 45 acted simultaneously on the two actuating faces 47 and 48 and so thrust the second clamping unit 23 away from the force output part 28 causing the second tightening face 25 to move toward the first tightening face 24.

By way of the through opening 34 the actuating space 46 is furthermore constantly connected with the interior 13 of the hose.

During assembly of the contractile drive firstly after previous insertion of the loading means 45 the second clamping unit 23 is slipped onto the bearing tailpiece 32 of the force output part 28. No tightening nut 29 is fitted in this case. Then the end section 10 of the contractile hose 4 is plugged on as far as engagement with an abutment 52 onto the second clamping unit 23. The contractile hose is then flared out like a trumpet. After this the tightening nut 29 previously slipped onto the contractile hose 4 is pushed over the unit comprising the force output part 28 and the second clamping unit 23 so that the second clamping unit 23 assumes a position coaxially within the tightening or loading nut 29. The tightening nut 29 is now screwed on the force output part 28, the first tightening face 24 thrusting from the outside against the contractile hose 4, which bears internally against tightening face 25. The supporting force of the second tightening face in this case is due to the loading means 45, which bear against the two clamping units 22 and 23, between which they are placed.

The tightening nut 29 is tightened until the desired basic clamping action of the contractile hose 4 is achieved. During this operation the second clamping unit 22 is slipped coaxially over the bearing tailpiece 32 and simultaneously the intermediately arranged loading means 45 are compressed so that a return force is built up, which is constantly effective and supplies the opposite force for the clamping in position of the contractile hose 4.

Previously performed empirical measurements serve to ensure that the desired basic clamping action is reached when the tightening nut 29 has been screwed to a certain extent on the force output part 28.

The contractile hose 4 is now anchored in the clamping gap 26, the hose material being deformed in accordance with the configuration of the tightening faces 24 and 25.

If during operation of the contractile drive creep of the material of the hose body should occur the loading means 45 will prevent a reduction in the holding force with the preselected basic clamping action. Any reduction in the wall thickness of the contractile hose 4 within the clamping gap 26 will be immediately and automatically compensated for because the second tightening face 25 is caused to follow up by the force of the loading means 45. The clamping gap will be closed somewhat, but the clamping forces are maintained. Even un unfavorable conditions this means that the contractile hose 4 will be prevented for slipping out of the head pieces 2 and 3.

As an alternative to the constantly acting loading means 45 a design would be possible in which the action of the loading means would only begin when a certain event takes place, as for instance when a particular temperature is reached. This would more particularly allow the use of memory-metal with the properties of assuming particular configurations in a manner dependent on temperature.

In the working embodiment there is a further effect. This effect involves the use of a supporting fluid force for the effect of the loading means 45 on the basis of the fact that the fluid pressure obtaining in the interior space 13 of the hose simultaneously acts in the actuating space 46 as well and has a tendency to thrust the two actuating faces 47 and 48 away from each other.

A seal 53 placed between the two clamping units 22 and 23 and preferably between the bearing tailpiece 32 and the second clamping unit 23 prevents pressure medium from escaping between the relatively movable parts and into the surroundings.

Departing from a design, in which only friction forces between the head piece and the contractile hose serve to cause a reduction in the size of the clamping gap, the installation of separate loading means 45 in addition to the contractile hose 4 offers the advantage of high efficacy under all operational states even in the case of changes in the properties of the material of the hose body 5.

Owing to the clamping device 18 a secure hold of the contractile hose 4 is achieved, even if the wall thickness is substantially reduced owing to deformation of the material. The fact that even in the case of a substantial reduction in the thickness of the wall bursting of the contractile hose is not to be feared is dependent on the fact that fine holes are produced in the thin hose material creeping out of the clamping gap 26, such holes permitting an escape of fluid under gage pressure. It is in this manner that the design in accordance with the invention takes a certain safety aspect into account as well.

The invention claimed is:

1. A fluid operated contractile drive comprising a contractile hose extending between two head pieces, and contracting longitudinally when its internal hose space defined by it is acted upon by fluid pressure to exert axial tension forces on the head pieces drawing them together, the contractile hose being attached to at least one head piece by having its respective end section clamped in an annular clamping gap defined between clamping surfaces, extending at least partially inclined in relation to a longitudinal axis of the contractile hose, of a first clamping unit having a force output means serving for external force output and a second clamping unit able to be shifted axially in relation to the first clamping unit, and further comprising loading means provided in addition to the contractile hose and effective between the two clamping units and acting on the clamping units to reduce the width of the clamping gap, and wherein the contractile hose comprises a hose body of a material with rubber elastic properties and a strand structure arranged coaxially to the hose body, the strand structure being embedded in the material of the hose body.

2. The contractile drive as set forth in claim 1, wherein the loading means are so designed that they are constantly effective.

3. The contractile drive as set forth in claim 1, wherein the loading means possess resiliently elastic properties.

4. The contractile drive as set forth in claim 1, wherein the loading means comprise a mechanical spring means.

5. The contractile drive as set forth in claim 1, wherein, between mutually oppositely placed actuating faces of the two clamping units, an actuating space is defined, which contains the loading means.

6. The contractile drive as set forth in claim 5, wherein an actuating space is connected with the interior of the hose for fluid transfer.

7. The contractile drive as set forth in claim 1, wherein the clamping surfaces are at such a slope within the clamping gap that their distance from the longitudinal axis of the contractile drive increases toward the outer region, axially opposite to the contractile hose of the head piece.

8. The contractile drive as set forth in claim 1, wherein one or both of the clamping surfaces have a conical configuration at least partially over approximately their entire length.

9. The contractile drive as set forth in claim 1, wherein at least one of the clamping surfaces possesses a corrugated cross sectional outline.

10. The contractile drive as set forth in claim 1, wherein the first clamping unit fitted with the force output means fits around the contractile hose on the outside thereof.

11. The contractile drive as set forth in claim 1, further comprising holding means serving to brace together the two clamping units in order to maintain a basic clamping action of the contractile hose independently of the state of fluid actuation of the interior of the hose.

12. The contractile drive as set forth in claim 1, wherein the first clamping unit comprises a force output part, provided with the force output means, and a tightening nut able to be screwed on the force output part and having one of the tightening faces, the second clamping unit having the other tightening face being arranged coaxially within the tightening nut and being borne in an axially sliding fashion on the force output part.

13. The contractile drive as set forth in claim 12, wherein the second clamping unit fits externally around the bearing tailpiece of the force output part for axial sliding motion.

14. The contractile drive as set forth in claim 12, wherein the loading means are arranged between the second clamping unit and the force output part.

15. The contractile drive as set forth in claim 1, wherein the loading means are located in a region, which is within the contractile hose.

* * * * *